3,356,619
METHOD OF POLYMERIZING
TETRAHYDROFURAN
Irving Kuntz, Westfield, N.J., assignor to Esso Research and Engineering Company, a corporation of Delaware
No Drawing. Filed Aug. 31, 1964, Ser. No. 393,405
8 Claims. (Cl. 260—2)

ABSTRACT OF THE DISCLOSURE

A method for polymerizing tetrahydrofuran by contacting the monomer with a catalyst composed of an aryl methyl carbonium ion salt (such as triphenylmethyl hexachloroantimonate) and an epoxide (such as propylene oxide). The resulting polymeric product is useful as a precursor for the production of polyurethane, and is useful to improve the viscosity index of oils.

---

This invention relates to a method for polymerizing tetrahydrofuran. More specifically, it relates to the polymerization of tetrahydrofuran with a new and surprisingly active catalyst.

The polymerization of tetrahydrofuran is known in the art. The polymeric product which results therefrom poly(tetramethylene oxide), is a thermoplastic with a crystalline melting point of about 42° C., and is rubbery at temperatures above about 42° C. The polymer products are curable with organic peroxides and can be compounded with oils or carbon black. Lower molecular weight poly(tetramethylene oxide) polymers are useful to improve the viscosity index of oils and are also useful as precursors for the production of polyurethanes.

It has now been found that tetrahydrofuran (tetramethyleneoxide) can be polymerized with a new and surprisingly active catalyst system which is composed of an aryl methyl carbonium ion salt and an epoxide compound. By means of this very active catalyst system, small amounts of catalyst can be used to polymerize tetrahydrofuran at good rates. Thus units of a particular size can be made to produce more polymer, or in the alternative smaller units can be constructed to produce the same quantity of polymer. Additionally, while it is possible to produce the polymer with larger amounts of less active catalyst, this results in the incorporation of larger amounts of difficult to remove catalyst residues in the polymer. Such residues cause the polymer to degrade easily on exposure to heat or mechanical shear (such as on a rubber mill). Polymers containing relatively large amounts of catalyst residue have been worked on a rubber mill and it was noted that after about five minutes have become tacky and very difficult to process.

Briefly stated, the invention subsists in contacting tetrahydrofuran with a di- or tri-arylmethyl carbonium ion salt and a specific class of epoxide compounds to produce a polymer which is substantially pure poly(tetramethylene oxide). The mole ratio of epoxide compound to arylmethyl salt which is useful in this invention is in the range of 0.01 to 20. The mole ratio of arylmethyl salt to tetrahydrofuran is in the range of 0.00005 to 0.002. The mole ratio of epoxide compound to tetrahydrofuran must be no more than about 0.001 to 0.05, preferably no more than about 0.02 to 0.005.

The arylmethyl carbonium ion salt of this invention is a diaryl or triaryl compound having the generic formula:

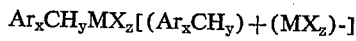

where Ar is a phenyl group, a naphthyl group or a substituted derivative of either of these. (Each of the Ar groups may be the same or they may be different.) M in the above formula is a metal or metalloid which may be any of antimony, tin, aluminum, boron, zinc, iron, titanium, zirconium, vanadium. X in the above formula is any of the common halides except for iodine, i.e., it may be chlorine, bromine, fluorine, or a mixture of these. $x$ is equal to either 2 or 3, while $x+y$ must be equal to 3, and $z$ is equal to the highest valence of $M+1$.

Examples of these arylmethyl carbonium ion salts include:

triphenylmethyl antimony hexachloride,
triphenylmethyl aluminum tetrachloride,
triphenylmethyl tin pentachloride,
triphenylmethyl boron tetrachloride,
triphenylmethyl dimethyl aluminum dichloride,
triphenylmethyl-chloro-boron trifluoride,
triphenylmethyl-bromo-antimony pentachloride, and
diphenylmethyl antimony hexachloride.

The preferred aryl group is the phenyl radical and the preferred metal is antimony. The most preferred salt is triphenylmethyl hexachloroantimonate (triphenylmethyl antimony hexachloride).

The epoxide compound which is useful in this invention is an oxirane (a 1,2-epoxide) or an oxetane (a 1,3-epoxide). The generic formula for these epoxides may be represented as:

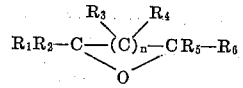

In the preceding formula any of $R_1$ through $R_6$ is a hydrogen or a $C_1$-$C_{10}$ alkyl group or a $C_1$-$C_4$ haloalkyl or a $C_6$-$C_{10}$ aryl or a $C_2$-$C_4$ ether. Preferably, the R's are selected from the $C_1$-$C_4$ alkyls or haloalkyls. $n$ in the above formula is equal to 0 or 1 and when $n$ is equal to 0 it is necessary that at least either $R_2$ or $R_5$ be hydrogen. The R groups may be the same or different within the limits of the above formula.

Examples of the epoxides that are useful in this invention include:

propylene oxide,
ethylene oxide,
epichlorohydrin,
trimethylene oxide,
styrene oxide,
allyl glycidyl ether,
2-phenyl oxetane,
3,3-bis(chloromethyl) oxetane,
1,2-dodecene oxide,
cyclohexene oxide, and
1,2-epoxy-5,6 trans-9,10 cis-cyclododecadiene.

The preferred epoxides are ethylene oxide, propylene oxide, and epichlorohydrin. Most preferred is propylene oxide.

The reaction can take place in various solvents. For example, an excess of tetrahydrofuran may itself be used as the solvent; alternatively, benzene, toluene, xylene, chlorobenzene, nitrobenzene, cyclohexane, or mixtures of these may all be used as appropriate solvents in this reaction. The preferred solvents are benzene, toluene, or an excess of tetrahydrofuran.

The conditions for the polymerization of tetrahydrofuran by this catalyst system are flexible. Temperatures of −100 to +80° C. may be used, although it is preferred that the temperature be in the range of −50 to +50° C. The pressure in the reaction vessel may vary widely from subatmospheric to several atmospheres and the reaction time may vary from minutes to weeks.

Various techniques can be used to contact the monomer with the catalyst system. For example, the solid arylmethyl salts can be dissolved in tetrahydrofuran which contains an epoxide. Alternatively, a stock solution of arylmethyl salt in a solvent can be prepared and a selected portion of this may be added to the tetrahydrofuran. Another method which can be used is to prepare stock solutions of both the arylmethyl salt and the epoxide compound and add these simultaneously to the tetrahydrofuran. Polymerizations may be carried out by the batch or continuous techniques.

The polymer may be recovered by precipitation in a nonsolvent (i.e. methanol or water), or by being slurried in boiling water while the solvent flashes off.

The invention may be more fully understood by reference to the following examples.

*Example 1.—Pure tetrahydrofuran is not polymerized by triarylmethyl salt initiators*

A standard method for the purification of tetrahydrofuran for polymerization is to reflux it over solid sodium hydroxide, distilling under nitrogen, then refluxing over lithium aluminum hydride and distilling therefrom immediately prior to use. (W. Sorenson and T. W. Campbell, Preparative Methods of Polymer Chemistry, Interscience, New York, 1961, page 255.) A sample of tetrahydrofuran was purified in this fashion, and 20 ml. taken and treated with 40 milligrams of triphenylmethyl hexachloroantimonate. This sample was placed in a constant temperature bath at 7° C. After standing for 24 hours the solution was poured into excess methanol. No polymer separated. A similar experiment was carried out at 25° C. and again no polymer was obtained.

*Example 2.—Minor amounts of propylene oxide together with tetrahydrofuran and triarylmethyl salt initiator are active for polymerization*

Propylene oxide in minor amount (0.1 ml., 0.008 g.) was taken with 19.9 ml. (17.6 g.) of THF. The mixed liquids were added to 40 mg. of triphenylmethyl hexachloroantimonate and placed in a bath at 7° C. for 3 hours. On pouring into methanol, polymer was precipitated which after drying weighed 4.8 g.

*Example 3.—Very small amounts of propylene oxide can be used to activate the polymerization*

Twenty ml. of tetrahydrofuran (17.7 g.) were combined with the following amounts of propylene oxide and then added to the catalyst and reacted as described in the previous example.

| Ml. Propylene Oxide | Yield of Polymer (g.) |
|---|---|
| 0.01 (0.008 g.) | 1.3 |
| 0.02 (0.016 g.) | 2.5 |
| 0.05 (0.041 g.) | 4.1 |
| 0.08 (0.064 g.) | 3.8 |

*Example 4.—Tetrahydrofuran purified by other procedures can be made to polymerize rapidly in the presence of small amounts of propylene oxide*

Tetrahydrofuran was treated by refluxing over 15% lithium metal dispersion in petrolatum and then distilling under nitrogen. According to gas chromatographic analysis this material was 99.8% pure. (The tetrahydrofuran used in Examples 1–3 was 99.99% pure, minimum.) Twenty ml. of this tetrahydrofuran was treated with the initiator and reacted at 7° C. as described in Example 1. After 24 hours, the mixture was poured into methanol; polymer precipitated which, after drying, weighed 4.06 g. Apparently this tetrahydrofuran is capable of a slow polymerization in the absence of propylene. However, the following data indicate how small amounts of propylene oxide significantly accelerate the polymerization rate.

| Tetrahydrofuran | | Propylene Oxide | | Polymer Yield After Reaction at 0° | |
|---|---|---|---|---|---|
| Ml. | G. | Ml. | G. | 16 hours | 2 hours |
| 19.98 | 17.7 | 0.02 | 0.016 | 13.6 | 3.4 |
| 19.97 | 17.7 | 0.03 | 0.025 | 13.9 | 3.4 |
| 19.95 | 17.7 | 0.05 | 0.041 | 13.8 | 3.3 |
| 19.90 | 17.7 | 0.10 | 0.083 | 15.1 | 3.5 |

*Example 5.—Tetrahydrofuran taken straight from the bottle can be polymerized in the presence of small amounts of propylene oxide but not in its absence*

Tetrahydrofuran, labeled Baker Analyzed Reagent and sold by the J. T. Baker Chemical Company was used in the following experiments without any further treatment. A 20 ml. portion was taken and added to 40 mg. of triphenylmethyl hexachloroantimonate. Reaction was allowed to proceed for 24 hours at 7° C. Pouring the mixture into excess methanol gave no polymer. A similar experiment was carried out except 0.1 ml. of propylene oxide was mixed with the tetrahydrofuran. After 3 hours reaction time, the reaction was terminated and 4.35 g. of polymer was isolated.

*Example 6.—Rate enhancement with propylene oxide is achieved when polymerization is carried out in the presence of diluents*

A solution was prepared in benzene with tetrahydrofuran which had been treated with lithium dispersion. The solution was made 12 molar in tetrahydrofuran and 0.0035 molar in triphenylmethyl hexachloroantimonate. Aliquots were placed in bottles in a constant temperature bath at 25°. At different times the reaction was terminated and the polymer isolated. In the table below the results in this experiment are compared with an identical experiment except that a small amount of propylene oxide was added. (The solution was made 0.071 molar in propylene oxide.)

| Reaction Time | Percent Conversion to Polymer | |
|---|---|---|
| | No Propylene Oxide | Propylene Oxide Present |
| 0.5 hour | None | 14 |
| 1.0 hour | None | 25 |
| 2.0 hours | None | 37 |
| 8.0 hours | 4 | 46 |

*Example 7.—A wide variety of epoxides can be used as the activator in triarylmethyl salt initiated polymerizations*

The following experiments were carried out with 20 ml. of tetrahydrofuran (purified with sodium hydroxide and lithium aluminum hydride) 40 milligrams of triphenylmethyl hexachloroantimonate and the chemical shown, at 7° C. as the polymerization temperature.

| Run No. | Chemical Added | Amount Added | Reaction Time, Hours | Polymer Yield, g. |
|---|---|---|---|---|
| 1 | None | | 48 | 0 |
| 2 | Cyclohexene oxide | 1 ml | 48 | 14 |
| 3 | Epichlorohydrin | 1 ml | 48 | 14 |
| 4 | ---do--- | 0.1 | 3 | 5.5 |
| 5 | ---do--- | 0.05 | 3 | 5.1 |
| 6 | ---do--- | 0.02 | 3 | 4.7 |
| 7 | Allyl glycidyl ether | 0.1 ml | 48 | 15 |
| 8 | None | | 3 | 0 |

The polymer obtained in Run No. 6 was analyzed and was shown to have the following properties: Differential thermal analysis of the poly(tetramethylene oxide) showed a melting point at about 42° C. X-ray analysis of the polymer showed it to be crystalline. The percent crystallinity depends on the method used for the calculations but is approximately 50 to 60%.

A sample was compression molded at 100° C. This sample when tested had the following properties:

Tensile at yield _____p.s.i__ 1350
Elongation at yield _____ 20–25%
Tensile at break _____p.s.i__ 4550
Vicat softening point _____F.__ 106°
Torsional modules —23° _____p.s.i__ 18,200

This invention has been described in connection with certain specific embodiments thereof; however, it should be understood that these are by way of example rather than by way of limitation, and it is not intended that the invention be restricted thereby.

What is claimed is:

1. A method for polymerizing tetrahydrofuran which comprises costacting said tetrahydrofuran with a catalytic amount of a catalyst system composed of:

(a) An arylmethyl carbonium ion salt of the formula $Ar_xCH_yMX_z$ where Ar is selected from the class consisting of phenyl groups, and naphthyl groups; M is selected from the class of antimony, tin, aluminum, boron, zinc, iron, titanium, zirconium and vanadium; X is selected from the class of chlorine, bromine, and fluorine; $x$ is an integer of from 2 to 3; $x$ plus $y$ is equal to 3; and $z$ equals 1 + the highest valence of M; and, (b) An epoxide of the formula

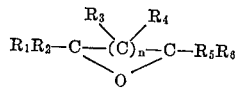

where $n$ is an integer of 0 to 1; and $R_1$–$R_6$ are selected from the class consisting of hydrogen, $C_1$–$C_{10}$ alkyls, $C_1$–$C_4$ haloalkyls, $C_6$–$C_{10}$ aryls, and $C_2$–$C_4$ ethers, so long as at least one of $R_2$ and $R_5$ is hydrogen when $n$ is equal to 0; wherein (c) The mole ratio of epoxide to tetrahydrofuran is no more than about 0.001.

2. The method of claim 1 wherein the mole ratio of epoxide to arylmethyl compound is in the range of 0.01 to 20.

3. The method of claim 2 wherein M of the arylmethyl compound is antimony.

4. The method of claim 3 wherein the arylmethyl compound is triphenylmethyl hexachloroantimonate.

5. The method of claim 4 wherein the epoxide compound is epichlorohydrin.

6. The method of claim 4 wherein the epoxide compound is ethylene oxide.

7. The method of claim 4 wherein the epoxide compound is propylene oxide.

8. The method of claim 7 wherein the mole ratio of epoxide to tetrahydrofuran is no more than about .05.

No references cited.

WILLIAM H. SHORT, *Primary Examiner.*

T. E. PERTILLA, *Assistant Examiner.*